Jan. 26, 1960 W. H. AITKEN ET AL 2,922,185
APPARATUS FOR STUNNING ANIMALS FOR SLAUGHTERING
Filed Dec. 27, 1955 2 Sheets-Sheet 1
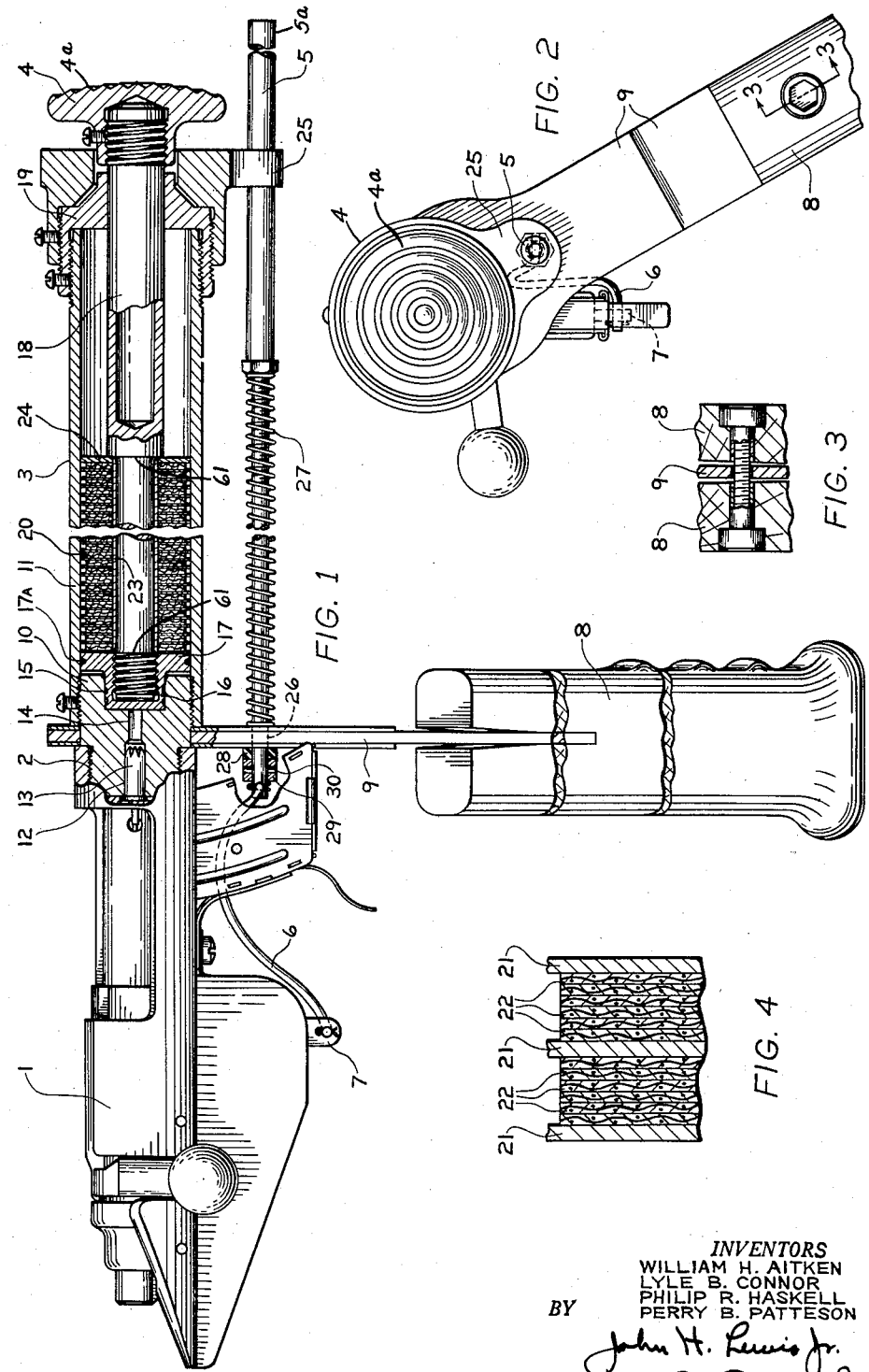
INVENTORS
WILLIAM H. AITKEN
LYLE B. CONNOR
PHILIP R. HASKELL
PERRY B. PATTESON
BY

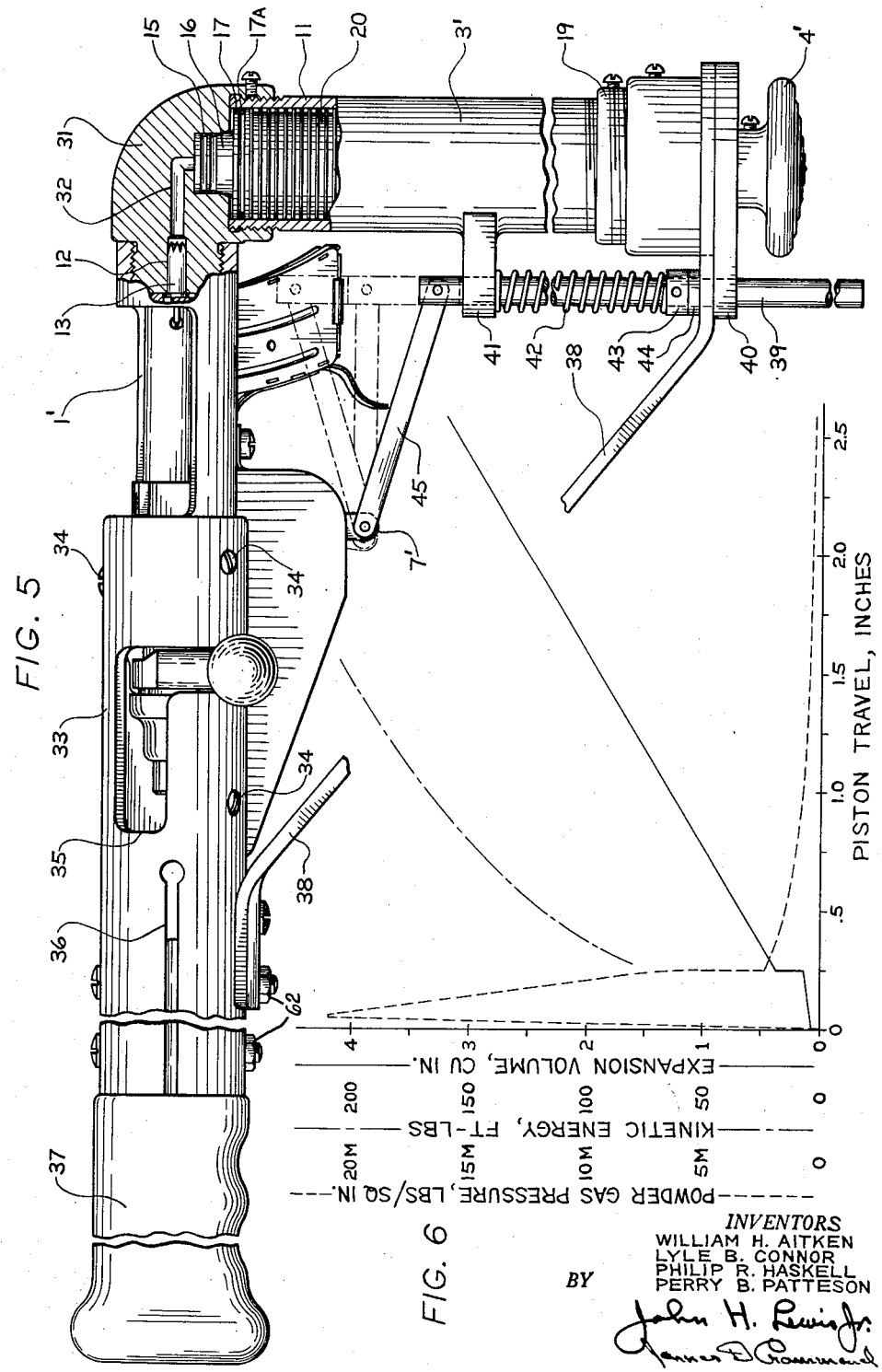

United States Patent Office 2,922,185
Patented Jan. 26, 1960

1

2,922,185

APPARATUS FOR STUNNING ANIMALS FOR SLAUGHTERING

William H. Aitken, Milford, Lyle B. Connor, Westport, and Philip R. Haskell and Perry B. Patteson, Fairfield, Conn., assignors to Remington Arms Company, Inc., Bridgeport, Conn., a corporation of Delaware Application December 27, 1955, Serial No. 555,357

5 Claims. (Cl. 17—1)

This invention relates to the slaughtering of animals for meat and for other purposes.

It will be realized that when animals are slaughtered for meat purposes it is necessary that the animal properly "bleed" out, and for this purpose the jugular vein or other major blood vessel is ordinarily severed with a knife. To facilitate complete bleeding the severed blood vessel should ordinarily be maintained at a lower level than the torso of the animal. In the meat packing industry most livestock are therefore hung up by one or both hind legs during the bleeding interval. While practice in the industry varies, it is generally recognized that needless suffering is prevented and the "sticking" operation facilitated if, prior thereto, the animal has been rendered unconscious by any suitable means. Western range cattle are unaccustomed to close contact with human beings and unaccustomed to close confinement. As a result, such animals are difficult and dangerous to handle on the killing floor to the extent that it is frequently impossible to shackle them for hanging without preliminary stunning, or if they are successfully hung without stunning, it is dangerous to approach them through flailing fore-legs to cut their throats.

It should also be recognized that the quality of the resulting meat, the completeness of the bleeding operation, and the facility with which further butchering operations may be performed are all to a large degree dependent upon the handling which an animal has received immediately prior to slaughtering. When an animal is shackled, hung up, and cut without stunning it is naturally frightened and in a highly excited condition. Its resultant struggles tend to cause bruises and other localized injuries which lower the quality of the meat and there are other incidental effects. It is an observed fact that fear and excitement cause an animal's blood pressure to increase as its heart beats faster, and result in the release of pro-thrombin and other substances into the blood stream. Blood may be forced into the extremities with such force that capillary blood vessels are ruptured, causing capillary hemorrhages. The release of pro-thrombin causes the blood to coagulate faster, hindering complete bleeding and assists in causing the condition known as "dark bleeding" and the retention of coagulated blood in the heart and chest cavity. "Stiff" cattle are another result of the absence or ineffectiveness of the stunning procedures employed, "stiff" cattle being identified as those which are difficult to skin because the hide is tight and the muscles in a set or unrelaxed condition tending also to make the meat "cut" poorly.

The Western European countries have long been practising humane stunning of sheep, hogs, and cattle. English law, for example, the Slaughter of Animals Act, 1933, requires that all livestock be humanely rendered unconscious by mechanical means prior to slaughtering. Among the methods employed in the European countries and elsewhere are the captive bolt brain-penetrating pistol, the use of free bullets, electric shock, and carbon-dioxide atmosphere "drowning." While these methods are gen-

2 erally effective from the point of view of reducing suffering of the meat animals, there are a number of sound practical reasons for not immediately applying these methods on a large scale in the United States. Foremost among these considerations is the fact that any method to have widespread use in the United States must take into account the prevalence of semi-wild range cattle as an important source of beef in the United States. Other significant considerations are economic, for the operating profit margin of most of the meat packers is only about seven mills per dollar of meat sales. As an example of the significance of the economic factor, the captive bolt brain penetrating pistol which is widely used in Great Britain destroys the saleability of the animal's brain, which is worth from five cents to seven cents per animal. For a packer processing 8,000 cattle per day, this seemingly insignificant amount per animal can amount to $125,000.00 per year. When such a tool is employed, the brain is condemned, not only because it has been mechanically injured or pierced by the penetrating tool with resulting bleeding, but also because it is contaminated by bacteria from the animal's hide which is carried in by the penetrator. Bone chips and other skull fragments are also objectionable when so driven into the brain. Further, any penetrating type instrument punches out a hole in the face leather which reduces the commercial value of the hide by about fifteen cents per animal and this amount projected over a year's operation seriously reduces the already narrow profit margin.

Where animals have been stunned in the United States meat packing industry, it has generally been by means of a special hammer on the order of a sledge hammer and this has been an operation requiring considerable skill on the part of the wielder of the hammer and one at times exposing that individual to material risk or physical injury by missed blows or by the actions of range cattle. Frequently more than one blow is required and there is no question but that animals so treated undergo considerable needless suffering. This operation almost invariably renders the brain unsaleable and and the resulting bone chips are frequently detrimental to the skinning operation by dulling and deflecting the skinning knife.

Industry practice in the United States then is, except where affected by the Kosher ritual, to consistently stun only range cattle; the domesticated farm cow is generally hung and cut without stunning, as are calves, sheep, hogs, and other smaller animals. Economic conditions have, except in isolated instances in the United States, taken precedence over the humane factors involved.

The primary objects of our invention are to produce a humane means of rendering an animal immobile and insensitive to pain, improving the quantity of the meat resulting, and without destroying or reducing the saleability either of the brain or of the animal's hide. A further object is the provision of a stunning device which may be used with ease and efficiency and without alarming an animal or inducing it to twist or dodge.

The exact nature of the invention as well as other objects and advantages thereof will become more readily apparent from consideration of the following specification, referring to the attached drawings in which:

Fig. 1 is a side elevational view of one embodiment of our tool, partially in section on the longitudinal axis of the tool.

Fig. 2 is a front elevational view of the Fig. 1 embodiment.

Fig. 3 is an enlarged partial sectional view on the line 3—3 of Fig. 2.

Fig. 4 is a fragmentary enlarged view of a portion of a shock absorbing buffer illustrated in Fig. 1.

Fig. 5 is a view similar to Fig. 1, illustrating a modification of our tool design.

Fig. 6 is a graphical diagram illustrating the internal ballistic factors involved in the operation of the tool.

Referring to the drawings by characters of reference, it will be seen that the tool illustrated in the first sheet of the drawings comprises an action unit 1 which may be similar to the action unit of a conventional bolt action magazine loading rifle of .22 caliber or may be in the form of any other conventional rifle action capable of loading, safely confining and firing a power cartridge of appropriate force. The action unit 1 is firmly connected, as by a threaded connection 2, to a barrel unit indicated generally by the reference numeral 3 which serves as a housing for the activating means impelling a non-penetrating striking element 4 having a pad-like, impacting face 4a. Carried on or parallel to the barrel unit 3 is a contact trigger 5 having a forwardly disposed contact tip 5a, said trigger being connected by a resilient link 6 to the trigger unit 7 of the rifle action 1. For convenience in operation, an elongated handle 8 is provided and attached to the assembly of rifle action and barrel unit by means which may include a multi-leaf spring 9, capable of cushioning the recoil forces which would otherwise be communicated through the handle to the operator of the tool. Without further considering the internal construction of the tool, it will be apparent that we have provided a long-handled stunning implement which may be moved toward the skull of an animal to bring the contact trigger into engagement therewith, and which thereupon discharges a cartridge to impel the striking element into violent engagement with the skull of the animal. Since at the time of engagement of the contact trigger with the skull of the animal, the tool, as a whole, is moving toward the animal's skull, and since the resilient link 6 prevents the stopping of this forward motion by the engagement of the contact trigger, it will be apparent that the tool has considerable forward momentum at the time the striking element is propelled forwardly with the inevitable rearward reaction of recoil. Thus, before recoil forces can be communicated to the hands of an operator, it is necessary to overcome the forward momentum of the tool and actually reverse that momentum. As a result, the forces communicated to the operator are minimized and are normally resisted by both hands, making operation over extended periods of time practicable without undue fatigue on the part of the operator.

In considering the details of the construction of the barrel unit 3, it will be noted that we have provided a barrel head 10 and a cylinder or sleeve 11. The barrel head is formed to define a cartridge receiving chamber 12 in which a power cartridge 13 may be received. This cartridge chamber communicates through a passage 14 with a primary cylinder 15, defined by the barrel head 10, sleeve 11, and piston 17. The sleeve 11 defines a secondary or expansion cylinder. The driving unit for the striking element 4 comprises a piston head defining a primary piston 16 received in the primary cylinder 15 and a secondary piston 17 which acts in the expansion cylinder defined by the sleeve 11. A friction ring 17a is received in an annular groove in the piston 17 tending to improve the gas seal but acting primarily as a means of frictionally retaining the piston in any pre-set position in the cylinder assembly. This piston head is threadedly connected to the piston rod 18 to which the striking element 4 is attached. The forward end of the cylinder sleeve 11 is closed by a cylinder head 19 which is apertured to permit the passage of the piston rod 18 and is threadably attached to the sleeve 11. Supported on the shank of the piston rod 18 is a shock absorbing buffer indicated generally by the reference numeral 20. It may be noted that the buffer unit as shown in more detail in the fragmentary Fig. 4 comprises an assembly of metallic washers 21 having confined between them one or more layers 22 of material such as a woven fabric, preferably nylon, impregnated with an elastic polymer, preferably neoprene.

It will be noted that the portion of the piston rod 18 within the buffer unit is reduced in diameter to a lesser diameter than the minor diameter of the threaded connection between rod and the piston head 16—17 to avoid a concentration of stresses at the thread root. To facilitate assembly of the buffer stack we prefer to provide a sleeve 23 of aluminum or other light material which is split longitudinally at one or more locations so that it may be spread and forced over the major diameter of the threads or applied to the reduced diameter portion of the piston rod in two pieces. It is the function of this sleeve to act as a filler, permitting the stack of buffer washers to be formed with holes large enough to pass over the major diameter of the threaded shank without resistance, while maintaining control over their concentricity in their assembled position. The use of aluminum or other light material for this sleeve contributes to lightening the piston assembly. Since this member tends to remain fixed in space as the piston assembly accelerates and decelerates, light weight minimizes the tendency for the sleeve to be deformed by impact with the annular shoulder 61 defining the end of the reduced diameter shank of the piston rod 18.

The buffer unit is confined on the shank of the piston rod 18 between the piston head and a washer or buffer head 24. It will be apparent that when the power piston is impelled through the cylinder assembly, the forward movement of the buffer head 24 will be stopped by engagement with the cylinder head 19, whereupon the buffer stack will be elastically deformed and will elastically store energy as well as dissipate energy in frictional engagement with the reinforcing fibers and with the intervening metallic washers 21. The buffer stack will ultimately stop forward movement of the piston head, and to the extent that there is rebound from the elastically stored energy will tend to return the piston assembly to its starting position. This cessation of forward movement of the piston head will, in turn, by means of tension in the piston rod 18, limit the forward movement of the striking element 4. Although it is not recommended, appropriate design of the buffer element permits the unit to be fired without impact of the striking element on any resisting object without damage to the tool. In normal use the work done upon the skull of an animal will materially reduce the forces applied to the buffer unit in stopping forward movement of the piston assembly.

The limiting condition for the design of a suitable buffer stack is that the compression modulus of elasticity of the composite buffer stack be such as to decelerate the piston without exceeding the tensile strength of the piston rod or of the connection of the striking element 4 thereto. By appropriate dimensioning and stacking of the polymer impregnated fabric disks the compression modulus of elasticity of the stack may be adjusted as desired to adjust the deceleration of the piston assembly within the desired limits. In the illustrative embodiment a plurality, six, for example, of the impregnated fabric disks 22 are confined between each pair of metal disks 21. This number can be varied within fairly wide limits between a stack in which few, if any, metallic disks are employed to one in which the fabric and metal disks are interleaved in a one-to-one ratio. It is, however, essential that either the metal disks or the fabric reinforcing, and preferably both, be employed to act in opposition to radial displacement while permitting an adequate degree of longitudinal displacement to safely decelerate the piston.

In the internal ballistic problem involved in a captive piston type tool it is desirable to effect a comparatively large expansion of the gas generated by the powder charge in a comparatively short travel. Assuming that a barrel bore of the same diameter as the expansion cylinder 11 is provided, the volume within which the powder gas is acting expands at so high a rate as the piston moves forward that the combustion of the powder is irregular and may be snuffed out altogether. If there were commercially available a powder of fine enough granulation and great enough "quickness," a state of regular combustion could theoretically be reached but such a powder is not available and, if it were available, would be too dangerous to handle.

Accordingly, it was necessary for this tool to provide some other means of insuring regularity of combustion and interior ballistic performance. It should be obvious that a stunning tool of this kind is useful only to the extent that its performance is uniform and predictable from one shot to the next.

The smaller diameter primary piston 16 and primary cylinder 15 provides a bore in which the primary expansion per increment of piston movement may be at a low rate during the period of powder burning when the burning rate of all smokeless powder compositions is so strongly dependent upon pressure. Once the burning is complete the expansion of the hot gaseous products may take place at any desired rate and the secondary cylinder 11 and secondary piston 17 provide for the expansion at a substantially more rapid rate per increment of piston movement.

The large diameter secondary piston 17 has the distinct advantage of providing maximum expansion volume for powder gas in a tool of minimum length, but as pointed out above this cannot be done with powders of commercially available "quickness" unless the primary-secondary type of piston is employed. The primary-secondary piston construction has the further advantage that the portion of the barrel which must sustain high pressures is comparatively short and can be of comparatively massive cross-section without introducing excessive weight to the tool assembly. The expansion cylinder portion 11 of the barrel, on the other hand, is required to sustain only relatively low pressures and may therefore be of relatively light cross-section. Further, this construction minimizes heat losses by minimizing the surface areas exposed to hot gases and acting to cool such gases during expansion.

Referring to Fig. 6, for example, some of the interior ballistic advantages of this construction are graphically illustrated. In this figure, piston travel in inches is plotted as the abscissa for all three curves. As ordinate for the solid line curve, we have plotted the volume in the expanding gas system in cubic inches illustrating the relatively low rate of expansion while the primary piston is engaged, with the abrupt step as the primary piston "uncorks" the primary cylinder, or opens up the space between the secondary piston and the barrel head followed by the higher rate of expansion in the secondary cylinder.

In dotted lines we have plotted powder gas pressure as the ordinate showing that peak pressure is passed prior to "uncorking" the primary cylinder and showing the abrupt drop in pressure which characterizes that action followed by the substantially exponential expansion in the secondary cylinder.

In dot-dash lines we have plotted the kinetic energy in the piston as a function of travel thereof, this plot pointing up that although a substantial amount of powder energy was transferred to kinetic energy during the primary portion of the stroke, the secondary expansion is required for the development of sufficient kinetic energy (preferably 200-foot pounds or more) for stunning a mature animal, the length of stroke necessary for this purpose being provided by the offset of the tool at the time of firing permitted by the use of the contact trigger.

The data graphically shown is intended only as illustrative, it being obvious that a wide selection of dimensional relationships may satisfy the requirements depending upon powder "quickness" space allotments, etc. For minimum bulk and shortest stroke required to transfer the energy of the powder into kinetic energy of the striking head, the fastest available powder should be used and the expansion in the primary cylinder should be at the highest rate permissible without arriving at a condition such that the charge will be "snuffed out." With a slower powder it is necessary to use a slower expansion ratio and a longer primary stroke to maintain and complete burning in the primary cylinder.

In the illustrative embodiment the primary expansion is achieved in a piston movement of about 0.3 inch and secondary expansion is achieved in a further piston movement. Using a charge of 2.5 grains of "Marksman" powder as an example, after a total piston movement of substantially one and one-half inches, 200-foot pounds of kinetic energy has been made available at the striking element. However, the expanding powder gases continue to deliver energy to the system during the further movement of about one inch permitted by the buffer stack as the striking element acts upon the animal's skull so that something over 250 foot pounds of kinetic energy is available for application to the animal.

In regard to the selection of powder, it has been noted above that a fast or "quick" powder is preferable. It is also essential that the powder be one which burns clearly and completely. One eminently suitable powder is that known as "Marksman" which is produced by the Hercules Powder Company. "Marksman" powder may be identified as an uncoated double base powder without incorporated inhibitors or deterrents and one having the high nitroglycerin content of 40%. "Marksman" powder is cut to a fine flake-like granulation of approximately 325 cuts per inch from .038" grain and is therefore an exceptionally fast and clean burning powder.

These considerations are of considerable importance in this tool, for as noted it is a closed system to confine the noise of explosion or report and no substantial escape is provided for the products of combustion. Using "Marksman" powder, it is possible to operate to at least the extent of a full day's operation for a large slaughter house without any disassembly or cleaning of the tool. While there is some accumulation of a fine gray ash, and some moisture will be noted upon disassembly immediately upon firing, these products are non-corrosive and non-erosive and will not burn to any further degree. The tool has been operated daily for periods in excess of a week without cleaning and without trouble, but, in large scale operations, daily cleaning is recommended.

We believe that the important criteria for powder selections are:

(1) Double base of high nitroglycerin content;
(2) Freedom from coatings or deterrents tending to leave residue on firing; and
(3) Granulation as fine as required to insure complete burning within the primary cylinder, it having been pointed out above that a slower burning powder, or one of coarser granulation, requires appropriate adjustment of the expansion ratio and stroke of the primary piston to insure that burning is completed.

It is preferable to initiate combustion of the powder charge with non-erosive, and non-corrosive primers having little or no powdered glass content and no corrosive or hygroscopic by-products of combustion.

In the case of the usual meat animal there will be present between the animal's brain and the impacting face of the striking element, layers of varying thickness of hide, fat or flesh, and the bony portion of the skull, which is made up of two dense layers of bone separated by a cellular structure. To successfully stun the animal we have found that it is necessary to have, depending on the size and age of the animal, between 200 and 400 foot pounds of kinetic energy in the piston assembly at the moment of impact; and it is further desirable to permit a further free movement of the striking element of substantially one inch, in the course of which the compressible elements of the animal's head are deformed and the shock applied to the brain in sufficient magnitude to cause immobilization and the loss of any sense of pain. These latter functions, however, should to the greatest extent possible be performed without the production of gross or depressed fractures of the skull such as would introduce bone chips into the brain or induce substantial hemorrhaging thereof.

In securing the desired stunning effect with minimum or no damage to the brain of the animal, the diameter of the face of the striking element is of substantial importance. It has been noted that even with mature and relatively hard-skulled animals, the use of a striking face of too small diameter will invariably result in complete penetration of the skull or at least in a depressed fracture thereof such as introduces bone chips into the brain cavity and causes gross bleeding within the brain. In either event, the brain is rendered unsaleable as an article of commerce. We have found that for mature beef cattle (cows or steers and small bulls), it is desirable to provide a striking face of between one and one-half and two and one-half inches in diameter and to apply a blow having a kinetic energy of between 300 and 370 foot pounds. The same limits apply to all hogs except large boars. For veal calves and other smaller animals having skulls of less resistant material and at the same time more valuable brains, it is desirable to increase the diameter of the striking face to more than 2½ inches, preferably about 3½ inches, and to reduce the amount of energy imparted to a range between 140 and 200 foot pounds.

For large animals such as old boars and bulls over about 1500 pounds, the striking head may have a diameter between 1½ and 2½ inches but the energy requirement is 360 foot pounds or more, preferably about 400.

In very general terms, it may be stated that the area contacted by the striking element should vary in substantially inverse proportion to the structural strength of the animal's skull and that the kinetic energy applied should vary in substantially direct proportion to the structural strength of the animal's skull.

The striking faces discussed above have been identified in terms of their diameter. Although it is convenient to provide circular faces it is not important that this shape be used, as any shape of equivalent area should be satisfactory provided that sharp corners, which might tend to pierce the hide on a slightly misdirected blow, are avoided. On this basis the area for veal calves, etc., should be between approximately 5 and 10 square inches and for the larger animals between about 1.75 and about 5 square inches. The energy requirements should be fairly uniformly distributed over the striking face.

As previously pointed out, it is desirable to provide for sufficient travel of the piston elements to fully develop the energy in the burning charge of propellent powder and thereafter to provide a sufficient stroke for performing the normal and expected operation on the skull of the animal. After these operations have been performed, further movement of the striking element is unnecessary and undesirable and it is at this point in normal operation that the buffer mechanism comes into play to stop further projection of the striking element by means of the elastic distortion of the resilient elements of the buffer stack and by friction of those resilient elements against the reinforcing fibers and the metallic washers in the buffer stack. An incidental benefit derived from this deceleration of the piston assembly is found in that the forces applied thereby to the cylinder head 19 are in opposition to recoil of the tool and reduce the recoil forces which would otherwise be communicated to the hands of the operator.

In ordinary operation, the animal's skull usually provides most, if not all, of the resistance necessary to stop the striking element, but, in the event of accidental firing or a missed blow, the buffer stack is an essential element to avoid damage to, and probable destruction of, the tool.

Obviously the desirability of providing for a definite degree of movement of the piston assembly before it commences to do its work upon the skull of the animal indicates that the cartridge should be fired while the striking face is yet some distance from the skull of the animal. The contact trigger 5 which projects substantially one and one-half inches forward of the retracted position of the striking element performs the function of firing the cartridge at the optimum spacing from the skull of the animal. This contact trigger, it will be noted, is supported for reciprocating movement in a bearing block 25 mounted on the cylinder head and in a hole 26 passing through the leaf spring assembly 9. Conveniently, a light coil spring 27 may be provided on the shank of the contact trigger, tending to urge the trigger to project in advance of the striking element, but this spring should not be of such force as to apply any significant opposition to movement of the barrel unit as a whole toward the skull of an animal after the contact trigger has been stopped by engagement therewith. Similarly, the link 6 is required only to be rigid enough to apply to the trigger 7 a sufficient degree of force to release the striker in the conventional rifle action. Thereafter, the link 6 should be capable of substantial deformation to the end that it will not offer substantial opposition to continued movement of the barrel unit toward the skull of the animal after the contact trigger has been stopped thereby.

The contact trigger is necessarily a rigid bar and has substantial mass and inertia. As the tool recoils, particularly in the interval prior to deceleration of the piston assembly by the buffer stack, the contact trigger may tend to remain fixed in space with the tool moving rearwardly at a substantial rate. To minimize the resulting shock on the contact trigger, we have provided a shock absorber 28 of resilient rubberlike material, preferably neoprene, which is confined on the contact trigger between the handle spring 9 and a stop collar 29 secured by a shear pin 30 to the contact trigger.

As a result, an animal may be struck lightly on the skull by the contact trigger and while the tool as a whole continues to move toward the skull, the cartridge is fired and the striking element impelled forcibly against the animal's skull, producing instant insensibility and immobility. There is, of course, an inevitable reaction to the forward propulsion of the striking element and this reaction necessarily appears as a recoil force applied to the tool as a whole. However, since the tool is in forward motion at the time the striking element is propelled forwardly and, since the mass of the complete tool is substantially greater than that of the forwardly propelled striking elements, a substantial proportion of what would otherwise be recoil force is consumed in merely stopping the forward movement of the tool. As previously pointed out, a further portion of recoil force is consumed in stopping the piston assembly. Thus, the remaining force which appears as sensible recoil and which is communicated to the operator through the spring 9 is materially reduced and does not tend to cause substantial operator fatigue.

The provision of the elongated handle 8 permits an operator to reach an animal to be stunned while such an animal is confined in a chute or to reach over an intervening animal and, in neither case does the operator have to approach in close proximity to the animal or expose himself to any danger from any over-excited animal. It has also been found that the short hammer-like movement of this tool improves the accuracy of the operator in comparison with the full overhand hammer swing of the present stunning method and does not tend to cause the flinching or dodging of the animal which is associated with the meat packer's use of sledge hammer type tools. Similarly, it will be noted that the cylinder sleeve 11 is not vented and that normal firing of the tool is not accompanied by a sharp pistol-like report which characterizes the use of firearms or the use of a captive piston penetrating tool of the type widely used in the British Isles. As a result of the absence of a pistol-like report, the other animals in a killing pen remain quiet and are not alarmed. As has been pointed out previously herein, the use of properly selected powder and priming avoids trouble from erosion or corrosion in such a closed system.

In the modified form of our invention illustrated in Fig. 5, the barrel unit 3' is substantially identical with that illustrated in the previously described embodiment. Where parts correspond to the Fig. 1 showing, the same reference numerals primed will be applied and there will be no further detailed description of those parts. The barrel head 31, however, differs from the barrel head 10 of the previous modification in that it performs an elbow function and positions the cartridge chamber and action unit 1' at a right angle to the barrel unit 3'. As a result, it is possible to materially shorten the assembly along the axis of the piston and permit easier use of the tool in killing pens where space may be restricted or where conditions permit an animal to assume a position with its head close to a wall or partition. In this barrel head the right angled gas passage 32 is the functional equivalent of the passage 14 of the modification previously described.

The action unit 1' is the full equivalent of that described in the previous modification but a handle support tube 33 is slipped thereover and secured to the action unit by suitable machine screws 34. A cut-out 35 is provided to permit the usual operation of the bolt handle of the action unit.

The support tube 33 may be longitudinally split as at 36 to receive the elongated handle 37 which may be secured by suitable cross bolts 62 and permits the tool to be swung with the same two handed grip as in the case of the previous modification. A brace 38 is provided to reinforce the right angled assembly and to serve as a guard against accidental impact on or damage to the trigger unit, the magazine or other components of the action unit.

The contact trigger 39 is supported in aligned bores in a muzzle plate 40, the brace 38 and in a block 41 secured to the cylinder sleeve 11, being urged to extend beyond the face of the striking element 4' by a suitable light spring 42. A stop collar 43 is pinned to the trigger 39 and a resilient buffer 44 is provided to limit the extension of the contact trigger and to prevent damage thereto as the tool recoils. This contact trigger is joined by a toggle link 45 to the trigger 7' of the action unit 1'. As the contact trigger 39 is pushed inwardly from its normal extended position the link 45 approaches or may pass beyond a position at right angles to the trigger 39 with possible displacement of the link and the trigger to the extreme positions indicated by the dot-dash lines. The operation of the toggle link 45 in approaching or in going beyond its right angle position does not impose substantial resistance to movement of the trigger bar and the only force tending to hold the contact trigger extended is the relatively light spring 42. The operation of the trigger and the firing of the power cartridge may therefore take place without sensibly impeding the forward movement of the assembly which, as previously pointed out, is of substantial assistance in minimizing the recoil communicated to the operator.

In summarizing the operation, either embodiment may be considered for they function in substantially the same manner. The striking head 4 is first retracted to a position adjacent the cylinder head 19 which places the primary piston 16 in its cylinder 15 where it will be retained by the action of the friction ring 17a engaging the cylinder sleeve 11. A power cartridge 13 may then be locked in the chamber 12 by the operation of the action unit 1 and the tool will be ready for the stunning operation.

An animal to be stunned may then be approached and the tool swung with a two-handed grip in a light hammer-like blow to engage the selected spot on the animal's skull at a right angle thereto. This operation may be performed with great accuracy and without disturbing an animal since no violent motions or long swings are involved.

Upon engagement of the contact trigger with the skull of an animal, the cartridge will be fired and the striking element driven forwardly to strike a stunning blow. The contact trigger permits sufficient standoff at the instant of firing to insure that the energy of the burning powder will, to a substantial degree, have been converted to kinetic energy of the piston before there is any actual impact with the skull and additional energy will be developed thereafter by the further expansion of the powder.

Engagement of the buffer stack with the cylinder head decelerates and stops the piston assembly and to the extent that there is elastic rebound from the buffer stack tends to return the piston to its starting position.

Since the tool was in motion at the time of firing of the power cartridge, the forward momentum of the entire tool is effective to cancel out recoil momentum resulting from the propulsion of the piston assembly. Also when the piston assembly is decelerated and stopped any excess momentum in the piston assembly is returned to the tool tending to further reduce recoil and the tool is not uncomfortable to use although it strikes a blow equivalent to that of a full swing with a heavy sledge hammer but with the advantage of precise control of the force of the blow and of the depth of penetration. Since there is no violent pistol-like report accompanying the use of this tool, none of the animals in the killing pen or approaching chutes become excited and this tool does not contribute to increasing the noise level prevailing in the slaughter house.

The invention has been here shown and described by reference to two preliminary embodiments thereof and it is not considered to be strictly limited thereto either as to the method or apparatus. Obviously, improvements or modifications may be made and some will be required before extensive use is made of our invention in commercial slaughtering operations. For example safety devices to prevent accidental discharge are contemplated but, for the sake of simplicity, are not here shown.

For exact definitions of the limits which we place upon our invention, reference may be had to the appended claims.

We claim:

1. Apparatus for stunning an animal for slaughtering by an instantaneous impact of a non-penetrating striking element against the animal's skull, comprising a cylinder; a barrel head fixed to the rearward end of said cylinder and having therein a propellant powder cartridge chamber in communication with said cylinder, means coupled to said barrel head for confining an firing a cartridge in said chamber, comprising an action unit, an assembly to be propelled forwardly from a rearward starting position by gaseous pressure of a cartridge fired in said chamber, comprising a piston in said cylinder, a piston rod projecting forwardly from said cylinder, and an animal striking element having a pad-like non-penetrating impact face mounted on the forward end of said piston rod, an abutment on the forward end of said cylinder restricting forward movement of said piston, shock absorbing means in said cylinder between said piston and said abutment, means for releasing said firing pin comprising a trigger rod mounted for reciprocation parallel to said cylinder and having a contact tip normally disposed forward of said striking element with said assembly in starting position, and drive linkage coupling said trigger and said action unit, said linkage being yieldable after release of said action unit to permit rearward displacement of said rod.

2. Apparatus according to claim 1, comprising a handle member mounted at substantially a right angle to said cylinder whereby said apparatus may be brought into position for operative engagement of said contact tip with an animal's skull by means of a hammer-like movement, and a shock absorbing spring member forming an element of the connection between said handle and said cylinder.

3. A portable explosive cartridge-actuated tool for temporarily stunning animals by a very sharp concussion against the head, comprising a cylinder assembly having an explosive cartridge chamber and a bore with a restricted portion and connected with said chamber, an explosion-actuated piston slidably received in said bore for limited reciprocating motion therein, buffer means positioned to act between said piston and said restricted portion of said bore, firing mechanism cooperatively associated with said cartridge chamber and cylinder member for firing an explosive cartridge positioned therein, a combined tool positioning and firing mechanism actuating means mounted on said cylinder member, a striking member secured to said piston for transmitting the force of a fired cartridge from said piston to the head of an animal, impact means on said striking member providing maximum resistance to penetration of the striking member into animal skin and bone structure, said combined tool positioning and firing mechanism actuating means cooperating with said impact means to consistently and uniformly limit the magnitude of the concussion produced by said impact means against an animal head to non-fatal levels and without substantial damage to skin or bone structure, said impact means comprising a laterally expanded impact portion on the striking end of said striking member, said portion providing a substantially flat relatively large contact area with respect to the size of an animal head for transmitting the forces generated by the tool to an animal head.

4. A tool according to claim 3, comprising an elongated member mounted at substantially a right angle to said cylinder assembly whereby said tool may be brought into position for operative engagement of said combined tool positioning and firing mechanism actuating means with an animal's head by means of a hammer-like movement.

5. A tool according to claim 4, including a shock dissipating spring member forming an element of the connection between said elongated handle member and said cylinder assembly.

References Cited in the file of this patent

UNITED STATES PATENTS

| 1,472,309 | Prisk | Oct. 30, 1923 |

FOREIGN PATENTS

| 218,433 | Great Britain | July 10, 1924 |
| 329,947 | Italy | Sept. 28, 1935 |
| 474,742 | Great Britain | Nov. 1, 1937 |